US009143633B2

(12) United States Patent
Collins et al.

(10) Patent No.: US 9,143,633 B2
(45) Date of Patent: Sep. 22, 2015

(54) BROWSER-BASED SCANNING UTILITY

(75) Inventors: John Collins, South Hamilton, MA (US); Sean Langford, Middleton, MA (US)

(73) Assignee: Lexmark International Technology S.A., Meyrin (CH)

( * ) Notice: Subject to any disclaimer, the term of this patent is extended or adjusted under 35 U.S.C. 154(b) by 363 days.

(21) Appl. No.: 13/156,426

(22) Filed: Jun. 9, 2011

(65) Prior Publication Data

US 2012/0086989 A1  Apr. 12, 2012

Related U.S. Application Data

(60) Provisional application No. 61/392,252, filed on Oct. 12, 2010.

(51) Int. Cl.
| | |
|---|---|
| H04N 1/00 | (2006.01) |
| H04N 1/32 | (2006.01) |
| H04N 1/44 | (2006.01) |
| G06F 9/445 | (2006.01) |

(52) U.S. Cl.
CPC ........ *H04N 1/00244* (2013.01); *G06F 9/44526* (2013.01); *H04N 1/00464* (2013.01); *H04N 1/00798* (2013.01); *H04N 1/00973* (2013.01); *H04N 1/32122* (2013.01); *H04N 1/4486* (2013.01); *H04N 2201/0039* (2013.01); *H04N 2201/0081* (2013.01); *H04N 2201/3225* (2013.01)

(58) Field of Classification Search
USPC .......... 358/400, 401, 403, 434, 442, 468, 474
See application file for complete search history.

(56) References Cited

U.S. PATENT DOCUMENTS

| | | | |
|---|---|---|---|
| 6,205,415 B1 | 3/2001 | Butts et al. | |
| 6,289,371 B1 * | 9/2001 | Kumpf et al. | 709/203 |
| 2002/0174206 A1 | 11/2002 | Moyer et al. | |
| 2006/0085516 A1 * | 4/2006 | Farr et al. | 709/217 |

FOREIGN PATENT DOCUMENTS

EP  0991227 B1  12/2005

OTHER PUBLICATIONS

Content Central, A Technical White Paper, Jan. 31, 2010, pp. 1-16, retrieved from the Internet:URL:http: //www.ademero.com/downloads/white-papers/WhitePaper_Ademero_ContentCentral_TechnicalWhitePaper.pdf.
International Search Report and Written Opinion issued on Dec. 1, 2011 in connection with PCT Application No. PCT/US2011/053854.

* cited by examiner

*Primary Examiner* — Thomas D Lee (57) ABSTRACT

A browser based scanning utility is provided that includes an applet delivery module for delivering a scanning applet to a web browser. A browser based capture application executes the scanning applet using the browser. The browser based capture application initiates a call. A web scanning module receives the call and activates one or more scanners for scanning one or more documents into specific image files. The web scanning module uploads the specific images to a document capture server for storage and maintenance.

30 Claims, 6 Drawing Sheets

BROWSER-BASED SCANNING UTILITY

PRIORITY INFORMATION

This application claims priority from provisional application Ser. No. 61/392,252 filed Oct. 12, 2010, which is incorporated herein by reference in its entirety.

BACKGROUND OF THE INVENTION

The invention is related to field of network applications, and in particular to a browser-based scanning utility.

Traditional document management, requiring extensive use of locally attached scanning devices, file servers, databases, and the like, has long been rooted in the technology of yesterday: namely, Windows-based client/server technology. A new era of computing is currently being ushered in; one that revolves around portability, cross platform support, and a new and growing installed base of mobile devices driven by Google, the resurgent Apple Inc. and others. Leveraging this new and increasingly adopted technology environment requires redesigning and, in many cases, reinventing wheels that no longer fit. Unfortunately, the enterprise document management space is largely tied to legacy client/server architecture. While most vendors offer a lightweight web client with limited functionality—to present a veneer of modernity—the bulk of the underlying technology is built on traditional Windows-based client server architecture. As Java technology continues to evolve and consume a greater percentage of development projects worldwide, more and more leading software companies are leveraging its portability and multi-platform capabilities to prepare for the next-generation Internet. The next generation Internet is one based on portability, open standards, and mobile device support. The ability to provide full document management functionality in the absence of traditional client/server technology while supporting any web browser on any platform along with a wide range of mobile devices presents a number of unique challenges.

SUMMARY OF THE INVENTION

According to one aspect of the invention, there is provided a browser based scanning utility. The browser based scanning utility includes an applet delivery module for delivering a scanning applet to a web browser. A browser based capture application executes the scanning applet using the browser. The browser based capture application initiates a call. A web scanning module receives the call and activates one or more scanners for scanning one or more documents into specific image files. The web scanning module uploads the specific images to a document capture server for storage and maintenance.

According to another aspect of the invention, there is provided a method of forming a browser based scanning utility. The method includes delivering a scanning applet to a web browser using an applet delivery module. A browser based capture application executes the scanning applet using the browser. The browser based capture application initiates a call. Also, the method includes receiving the call using a web scanning module that activates one or more scanners for scanning one or more documents into specific image files. The web scanning module uploads the specific images to a document capture server for storage and maintenance.

According to another aspect of the invention, there is provided a method of performing browser based scanning. The method includes delivering a scanning applet to a web browser. A browser based capture application executes the scanning applet using the browser. The browser based capture application initiates a call. Also, the method includes receiving the call and activating one or more scanners for scanning one or more documents into specific image files. Furthermore, the method includes uploading the specific images to a document capture server for storage and maintenance.

DETAILED DESCRIPTION OF THE INVENTION

The invention describes a browser base scanning utility that allows a user to scan documents using an internet browser. Document scanning is perhaps the most ubiquitous component described herein; leveraged in countless desktop applications worldwide. The invention attempts to build around the technology for the next generation Internet—one of platform independence, tablet computing, mobility, and more. Document scanning, quite simply, has near universal application yet it is still largely tethered to legacy Windows-based client/server technology. The invention takes advantage of the latest in Java technology while fully supporting both new and old scanning devices.

The invention can be formed using any platform independent based computer language, such as Java. This computer language allows one to develop applet code that can execute when an internet browser makes a request for such a code to be downloaded from a server and be executed on a client-side computer system. The applet code or applet can execute regardless of the specific operating system being utilized by the client side computer system. Given the small size of an applet, it is desirable to use an applet conjunction with mobile platforms such as smartphones or the like having internet browsing capabilities.

Figure 1:
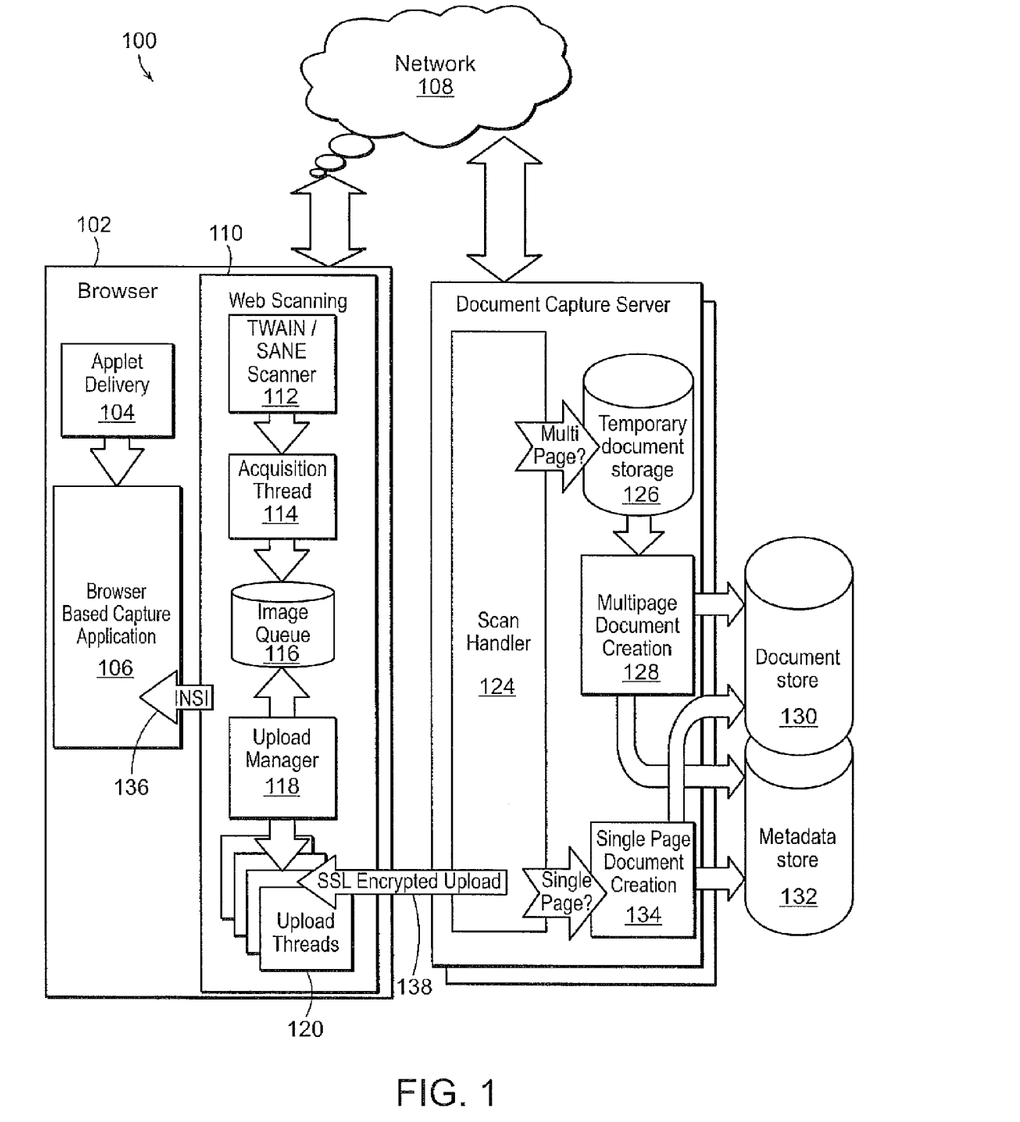
FIG. 1 is a schematic diagram illustrating the architectural framework of the invention.

FIG. 1 shows a schematic diagram of the framework 100 of the inventive browser based scanning utility. The framework 100 includes an internet browser module 102 that has an applet delivery module 104 and browser based capture application 106. The internet browser module 102 is an integrated computer module or plug in that can be incorporated to any kind of internet browser, such as Firefox or Internet Explorer. The applet delivery module 104 provides the necessary means to deliver a scanning applet for performing the browser base scanning operations. The applet delivery module 104 provides the scanning applet to the browser based capture application module 106 which uses the applet to initiate on a client computer browser based scanning of a document.

The framework 100 also includes a web scanning module 110. The web scanning module 110 has an image capture module 112 that comprises a list of available image capture devices such as TWAIN/SANE scanners or the like which are available for use by the framework 100. The image capture module 112 provides this list of scanners to an acquisition thread. The acquisition thread module 114 is used to retrieve the appropriate drivers and other necessary information for a selected scanner within the list of available scanners to be ready for use. Also, the acquisition thread module 114 performs the scanning of the documents and forwards the images to an image queue 116. The image queue 116 puts into a queue all the images scanned by the acquisition thread module 114. The web scanning module 110 further includes an uploading manager 120 for uploading scanned image data to a document capture server 122 associated with framework 100. The uploading manager 120 uses a plurality of uploading threads to manage its uploading operations and for every image and its respective image data to be uploaded to the document capture server 122, the uploading manager sends a request to the image queue to selectively remove from the queue all information associated with the uploaded image. The image data can include in memory files or the like.

The browser based capture application 106 initiates a Javascript Native Interface (JSNI) call 136 to the web scanning module 110. The JSNI call 136 activates the web scanning module 110 to prepare its respective components 112, 114, 116, 118, 120 for scanning. It is noted the applet delivery module 104, browser based capture application 106, and image capture module 112 are being managed and executed on a client. The client can include a PC-based system or mobile systems, such as smartphones or handheld devices such as the Ipad or the like.

The document capture server 122 receives from the web scanning module 110 a SSL encrypted upload message 138. The SSL encrypted upload message 138 is sent over the network 108 to the remotely located document capture server 122. In the other embodiments of the invention, the document capture server 122 can be located on the client as well. The document capture server 122 includes a scan handler module 124 that receives the SSL encrypted upload message 138. The scan handler module 124 analyzes the content of the SSL encrypted upload message 138 to determine whether the uploaded image comprises a single page or multi-pages. If it is determined that the uploaded image includes a single page, the scan handler module 124 forwards the uploaded image to a single page document creation module 134.

The single page document creation module 134 stores the metadata associated with the uploaded image to a metadata store 132, and creates a document trail. The single page document creation module 134 permanently stores the uploaded image in a document store 130. If it is determined that the uploaded image include multi-pages, the scan handler module 124 forwards the uploaded image to a temporary document storage 126 where each page of the uploaded image are separately stored. A multipage document creation module 128 retrieves separately each of the pages of the uploaded image from the temporary document storage 126, stores the metadata associated with each page of the uploaded image to the metadata store 132, and creates a document trail. Also, the multipage document creation module 128 stores each page of the uploaded image in a document store 130.

The document store 130 and the metadata store 132 can be positioned remotely or locally with the document capture server 122.

Figure 2:
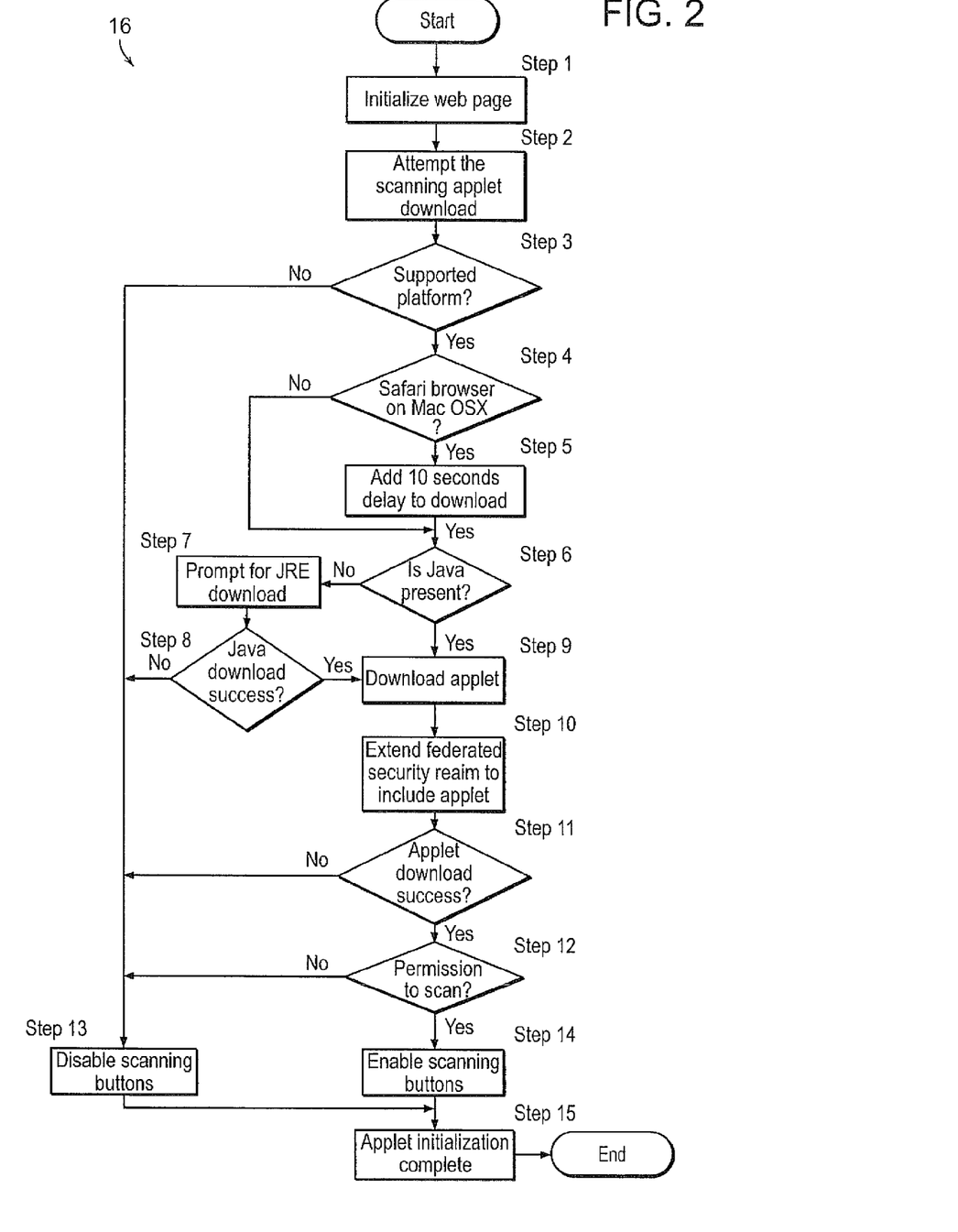
FIG. 2 is a flowchart illustrating the applet delivery process in accordance with the invention.

A Java applet is a program written in the Java programming language that can be run in a web browser. The advantage of a Java applet is the ability to provide rich software functionality to web applications that cannot be provided by HTML alone. FIG. 2 shows a flowchart 16 illustrating the operations of the applet delivery module 104.

The first step in delivering the Java scanning applet is to seat a web page with embedded logic that initiates the scanning applet download process, as shown in step 1. At the start of the download process, as shown in step 2, the containing browser receives a session nonce—a random number uniquely identifying the current session—to be used for all subsequent communication with the deploying server using the browser based capture application 106. To ensure complete end to end security, the applet must be digitally signed. A digital signature on the applet guarantees applet integrity along with point of origin and provides privileged access at the desktop; a requirement for interfacing with low level hardware devices such as scanners.

Applet downloading is far from automatic as several requirements need to be checked and verified prior to successful completion of the download process. For starters, the target platform must be checked against a list of supported platforms, as shown in step 3. Currently, only the iPad—released just a few months ago—does not support scanning. This is due to the relative infancy of the device and the current lack of native drivers to support scanning. As such, the scanning applet cannot yet be used on the iPad and the download process is terminated when the iPad platform is detected. All other platforms are fully supported. The next step is to verify the target browser and adjust the download process accordingly. Currently, only the Safari browser running under Mac OSX requires special handling, as shown in step 4. This special handling requirement results from the parallel loading capability of the Safari browser and the likelihood of premature communication with a partially downloaded applet. To ensure the applet is fully downloaded prior to any communication attempt, a ten (10) second delay is introduced during which time no communication is attempted between browser and applet, as shown in step 5. The last important validation step in the applet download process is to verify the existence of the appropriate Java Runtime Environment (JRE), as shown in step 6. If the minimum required JRE is present, the download process is allowed to continue to completion. If the appropriate JRE is not present, the end user is prompted to download and install the proper JRE as shown in step 7, and, if successful as shown in step 8, the applet download is allowed to continue to completion, as shown in step 9. A successful applet download confirmation is required prior to checking embedded end user permissions.

Since applets function outside the browser's cookie space, applet communication is effectively outside the established security realm. As this is a less than optimal security structure, it is necessary to extend the federated security realm to include the applet, as shown in step 10. By passing the cookie's session value explicitly from browser to applet during the applet delivery process, the applet is granted the same authentication as the browser. Following the extension of the federated security realm to the applet, it is necessary to verify that the applet download process completed successfully, as shown in step 11. If any failures are detected at this point, scanning is unavailable and any associated scanning button(s) are disabled.

Once included in the federated security realm, the applet is free to function subject to established end user rights and permissions. Specifically, an end user's permission to scan documents should be a top level check prior to unlocking the capabilities of the scanning applet, as shown in step 12. If an end user does not have permission to scan, then an associated scanning button should be disabled, as shown in step 13. Likewise, an associated scanning button should be enabled if scanning rights exist, as shown in step 14. Once an associated scanning button is either enabled or disabled, the applet initialization process is complete, as shown in step 15.

In any application where workflow is being utilized, end user rights can vary according to location within a workflow. An end user without the ability to scan at one point may very well have the ability to scan at a different point. It is due to the variability of end user rights that the applet should always be downloaded, even if end user permissions aren't immediately available.

Figure 3A:
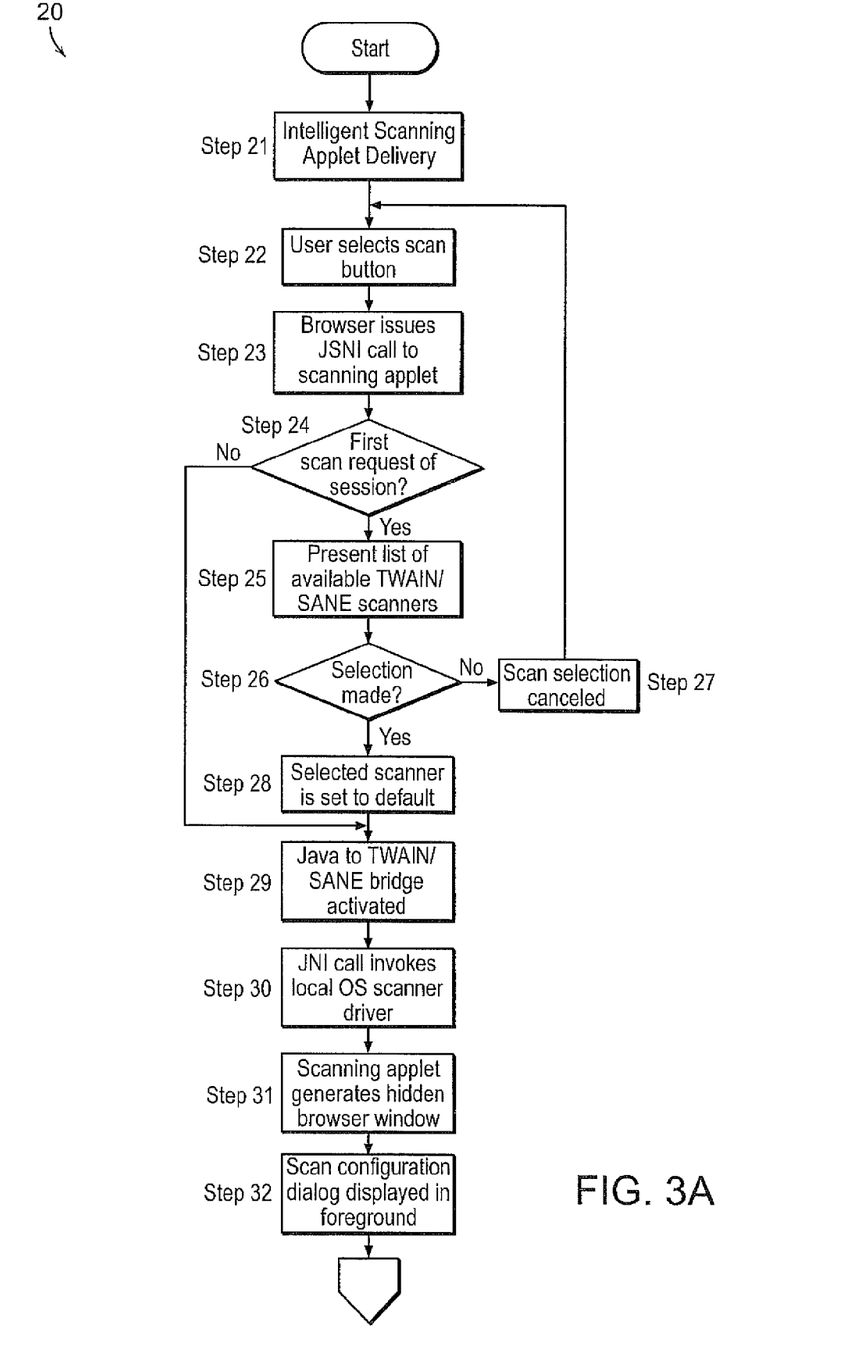
FIGS. 3A-3B is a flowchart illustrating the browser based scanning process in accordance with the invention.
Figure 3B:
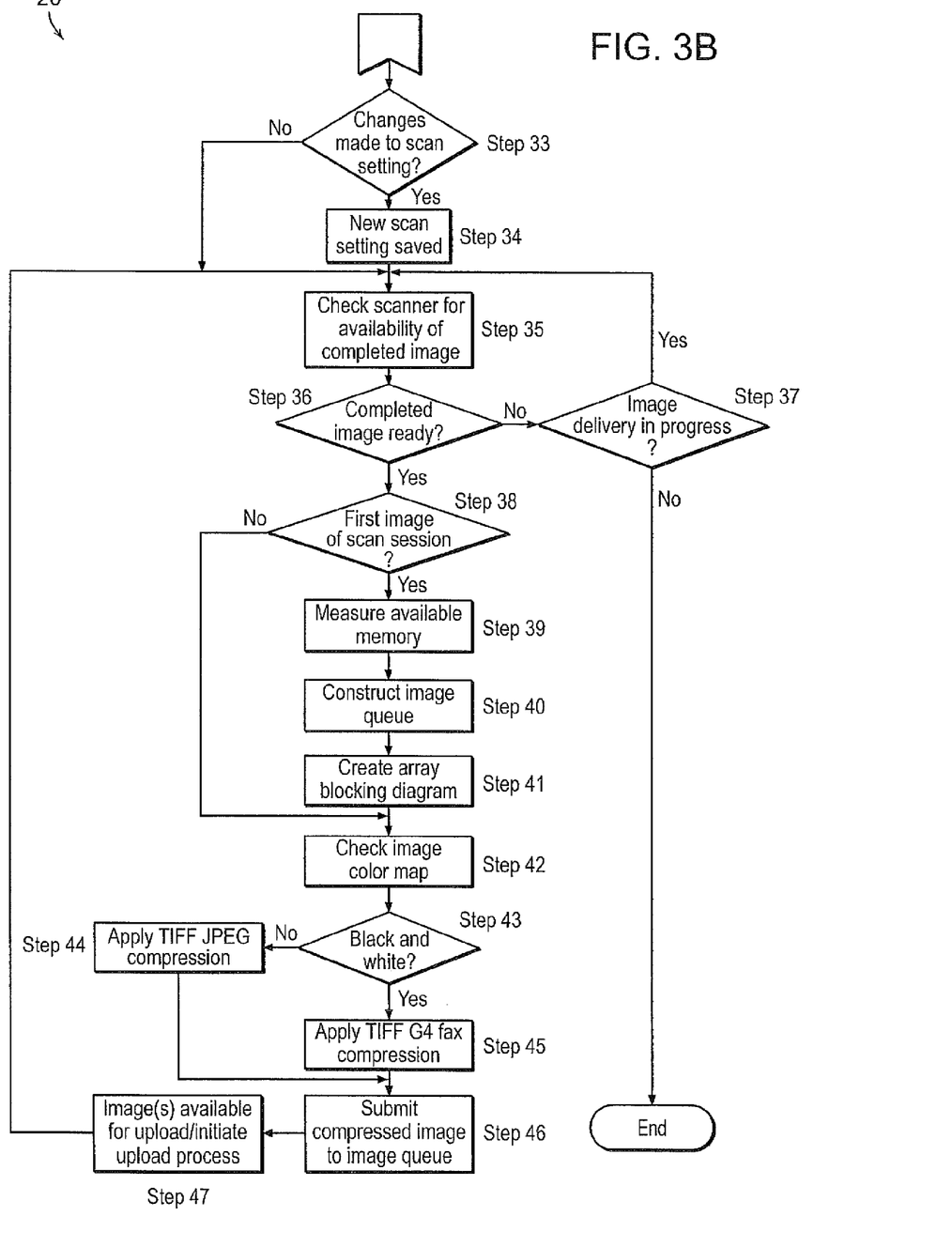

Browser-based document scanning functionality is delivered through a Java applet using the browser based capture application 106. The scanning applet is delivered to the browser as described in FIG. 2. FIGS. 3A-3B show a flowchart 20 illustrating the operations of the image capture module 112, acquisition module 114, and image queue 116 of the web scanning module 110. In particular, FIG. 3A shows steps 21-32 and FIG. 3B shows steps 33-47 which is the continuation of the process shown in FIG. 3A.

The scanning process cannot begin until the scanning applet is successfully downloaded and initialized. As such, the Intelligent Scanning Applet Delivery process as discussed in FIG. 2 must be completed as shown in step 21. The scanning process is initiated by end user interaction; typically in the form of an end user selecting a 'scan' button labeled or marked with a scanner or similar icon using the browser based capture application 106, as shown in step 22. The scan button is only available following successful download of the scanning applet. Once the user selects the scan button, the browser issues a JavaScript Native Interface (JSNI) call to the scanning applet using the browser based capture application 106, as shown in step 23. The JSNI protocol allows the browser to invoke embedded object methods and properties such as those found in a Java applet. This, in turn, extends the functional capabilities of the browser by enabling advanced functionality not generally available via standard HTML web pages.

When selected for the first time during the currently active session, as shown in step 24, the end user is presented with a 'scanner selection' dialog window displaying a list of available TWAIN/SANE-compliant scanning devices as shown in step 25. TWAIN is a standard software protocol and API that regulates communication between applications and image acquisition devices on Windows and Mac OS X platforms. SANE is a similar software protocol and API that regulates communication between applications and image acquisition devices on a variety of Unix platforms including AIX, BeOS, HP-UX, Linux, OpenBSD, OS2, Solaris, and Unixware. The scanning architecture described herein supports the TWAIN and SANE standards, so any and all TWAIN/SANE-compliant capture devices are fully supported.

At this point, the end user can either select an entry from the displayed list, as shown in step 26, or cancel the scan process, as shown in step 27. Once a scanning device is selected from the list, that scanner is set as the default scanning device for the remainder of the currently active session, as shown in step 28, and the scanner selection dialog is no longer presented to the end user at scan time. The end user can always change the default scanning device through an available menu option that displays the scanner selection dialog window.

Once a scanner has been set as the default scanning device, the applet activates the Morena Java to TWAIN/SANE bridge, as shown in step 29. Morena is an image acquisition framework for Java that acts as a bridge between the image acquisition hardware and Java; in effect allowing direct communication between the scanning applet and the selected scanning device. Morena provides or forms the acquisition threads 114 needed for performing scanning operations. Once activated, the Morena bridge library is used to execute a Java Native Interface (JNI) call to invoke the scanner driver installed in the local operating system and begin the scanning process, as shown in step 30. By default, browsers only relinquish focus for windows which emanate from the browser itself. When the Morena library executes a JNI call to the locally installed TWAIN/SANE driver, it does so outside of the browser. As such, all resulting dialog or configuration windows presented by the TWAIN/SANE driver would appear behind the browser and thus be unusable. To address this challenging browser behavior, the scanning applet creates a dummy invisible window, as shown in step 31 that pushes the browser window to the background. Once the browser is in the background, all subsequent TWAIN/SANE dialog windows appear in the foreground as expected.

As is typical with TWAIN/SANE drivers, a scan configuration dialog window is displayed as soon as the scan process is initiated, as shown in step 32. The TWAIN/SANE configuration dialog presents the end user with a variety of scanning parameters to set and/or adjust including saturation, color depth, resolution and more. Each TWAIN/SANE driver is unique to the scanning device being used and the associated configuration dialog only includes features and functionality available with that specific scanning device. Unlike the select scanner dialog, which stays hidden once a default scanner is specified, the scan configuration dialog appears each time the scan button is selected; allowing the end user to alter scan settings, select a pre-defined configuration, or scan with the default settings. In any case, the user must select a scan button located in the TWAIN/SANE configuration window to activate the scanning device. If a user chooses to alter any scan settings before scanning, as shown in step 33, those settings are saved as the new default scan configuration, as shown in step 34.

Once the scan button on the TWAIN/SANE configuration window is selected, the scanner is activated and the applet checks for the availability of a completed image, as shown in step 35. If a completed image is ready, as shown in step 36, it is passed along for processing by the applet. If a completed image is not ready, then an additional check must be performed to determine if an image is in the process of being delivered, as shown in step 37, or if the scanning device is out of images. A status of 'delivery in progress' is typically the result of querying the scanning device while the image is still in the process of being assembled and/or delivered to the applet. When the device indicates that no more images are available, the scanner notifies the scanning applet and the scanning process terminates the polling operation, closes the hidden browser window, and returns the main browser to the foreground for the next task.

Depending on the scan settings chosen, images are made available at varying rates. To optimize the capture process, the scanner is continuously polled to capture each image at the earliest opportunity. So as not to maximize CPU utilization on the local machine, a 200 ms delay is implemented between polling checks. Continuous polling also serves to smooth out variances in image delivery times due to scanner mechanics and embedded scanner pre-processing tasks.

When a completed image is finally available, the applet checks to see if its the first image of the scanning session, as shown in step 38. If it is the first image of the scanning session, then it is analyzed, stored in memory, and used to calculate the size of the in-memory image storage queue. The specific steps undertaken to create the in-memory image queue include measuring the amount of available memory, as shown in step 39, calculating and constructing the image queue in memory, as shown in step 40, and creating an associated array blocking diagram, as shown in step 41. The image queue size is calculated by dividing available memory by the size of the first image and then multiplying the result by a padding factor of 0.6 as shown:

$$(\text{available memory}/\text{size of first image})*\text{padding\_factor}$$

The padding factor has the effect of under-sizing the in-memory image queue to mitigate the risk of varying length images and leave additional memory available to the applet and other system processes. In any situation where a combination of very fast scanner and very slow network results in the image queue filling up, the applet automatically throttles back the scanner.

Once the in-memory image queue is sized and created, the applet checks the image color map associated with the completed image to determine the type of image compression to apply, as shown in step 42. If the image is determined to be something other than black and white, as shown in step 43, then the image is compressed using a standard TIFF MEG compression algorithm, as shown in step 44. If the image is determined to be black and white, then the image is compressed using a standard TIFF G4 fax compression algorithm, as shown in step 45. Since black and white (bi-tonal) images comprise the vast majority of paper documents in the business community, this compression step forms the main artery in the image pathway and is optimized accordingly. After compression, the image is placed in the in-memory image queue, as shown in step 46, the applet checks for the next completed image and the process is repeated until no more images are available. Once at least one image has been successfully added to the in-memory image queue, the scanning applet initiates the upload process to be further discussed in FIG. 4, as shown in step 47.

Error checking is robust and embedded throughout the scanning process. If any errors are encountered during the scanning or upload processes, the scanning and upload processes are halted, the hidden browser window is closed, the main browser window is returned to the foreground, and an appropriate error message is delivered to the end user describing the error.

Figure 4:
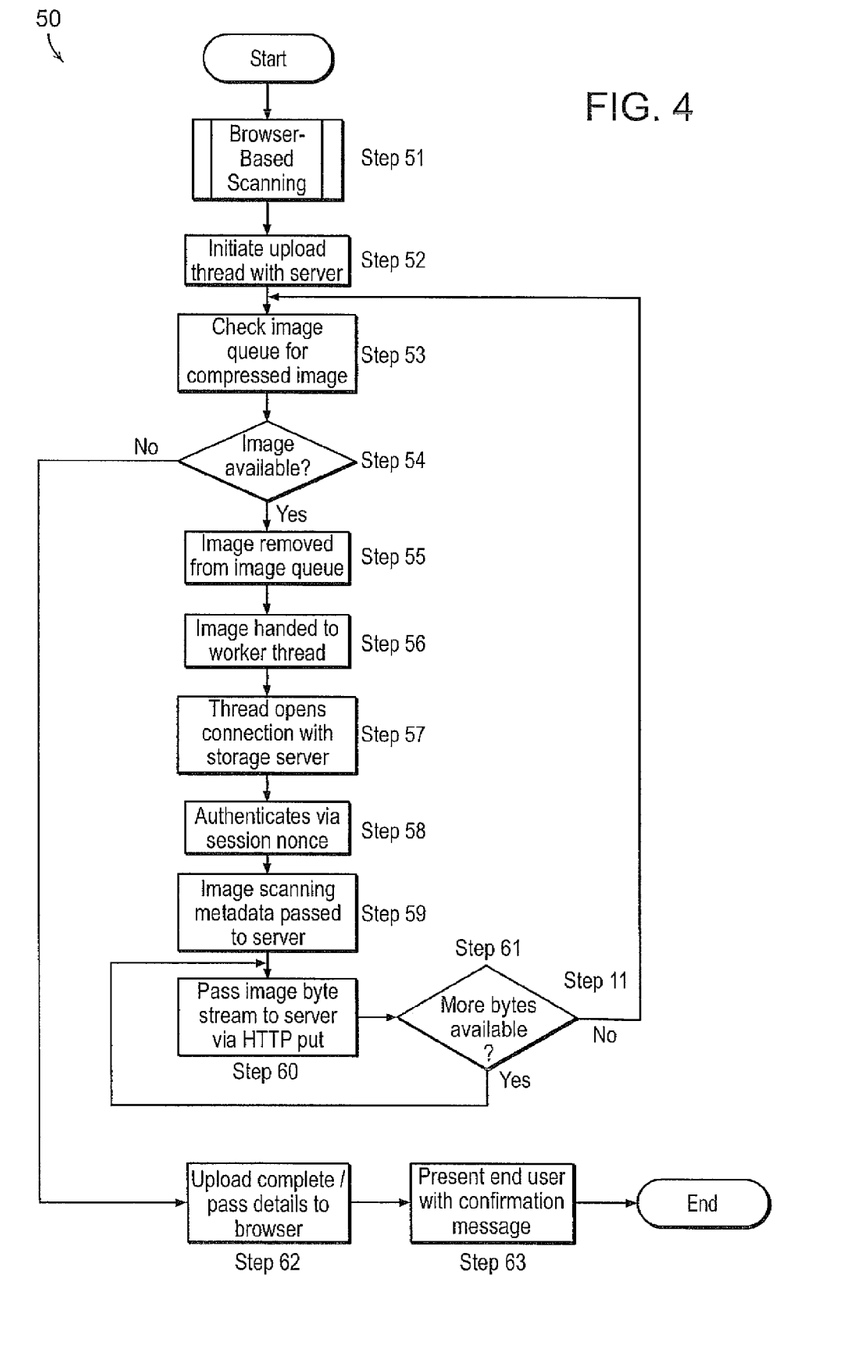
FIG. 4 is a flowchart illustrating the uploading process in accordance with the invention.

FIG. 4 shows a flowchart 50 illustrating the operational steps performed by the upload manager 118 and upload threads 120. As images are retrieved from one or more attached TWAIN/SANE capture devices and submitted to various in-memory image queues, it is necessary to securely move those images to one or more remote defined storage locations at a rate equal to or greater than the combined capture speed of the operating TWAIN/SANE devices. To accomplish this, each scanning applet has the ability to initiate its own set of upload threads to enable not just parallel uploading between all operating TWAIN/SANE devices, but also parallel uploading at each TWAIN/SANE device. Data security is accomplished through the application of Secure Socket Layer (SSL) encryption on all images and associated metadata.

The scanning transmission process is initiated by the scanning applet once the image queue build process is underway, so the scanning process as discussed for FIGS. 3A-3B must commence as a first step, as shown in step 51. Once the in-memory image queue is constructed for a particular TWAIN/SANE capture operation, the scanning applet initiates a master upload thread with the document capture server, as shown in step 52 and then begins polling the image queue for the presence of a compressed image, as shown in step 53. The master upload thread is responsible for creating, managing and removing worker threads as needed to address variable volumes and rates of images added to the in-memory image queue. Similar to that for the scanner, the master upload thread polls the image queue for new images on a 200 ms cycle so as not to tie up the local CPU.

Once a completed image is available for transmission to the server, as shown in step 54, the image is removed from the image queue, as shown in step 55, and passed off to a unique, reusable worker thread, as shown in step 56. The newly spawned worker thread focuses exclusively on managing the transmission of that specific image. To undertake the actual image transmission, the worker thread begins by opening a connection with the storage server, as shown in step 57. Specifically, the worker thread opens a connection using the same host, port, and protocol information delivered and stored with the scanning applet. To successfully connect to the remote server, the worker thread must supply the same session nonce received during the scanning applet download process. Once the correct nonce is provided to the server, the worker thread is able to successfully authenticate, as shown in step 58, and begin passing data.

The first data passed to the server is the image scanning metadata. Prior to delivering the actual image, the worker thread passes key metadata to the server including the default scanner file type, page number, multi-page flag, last page indicator, user ID, and more, as shown in step 59. After the image metadata is passed to the server, the worker thread begins transmitting the actual image data in byte stream format using the HTTP put construct, as shown in step 60. To accomplish the byte stream transmission, the content type is set to binary octet-stream and the destination URL is constructed from the same origin as that used to deploy the applet. This allows the transmission process to comply with the Java 'same origin policy' constraint.

Since images vary in size, the amount of bytes to be transmitted is likewise variable. To determine completion of the upload process and free the worker thread to perform other tasks, the byte-stream is closely monitored. At each monitoring pass, if more bytes are available, as shown in step 6, the byte-stream transmission remains in monitored mode and data continues to flow to the server via HTTP put. If no more bytes are available, the reusable worker thread is freed up and ready to be assigned the next available completed image. The process continues until no more images are available.

If no more images are available in the in-memory image queue, the transmission process is terminated and details are passed to the browser, as shown in step 62. As a last step, the end user is presented with a confirmation dialog displaying the details of the scanning transmission process, as shown in step 63.

Similar to the scanning process, error checking is robust and embedded throughout the transmission process. Since the transmission process is running in parallel with—and dependent upon—the scanning process, if any errors are encountered, the scanning and transmission processes are halted, the hidden browser window is closed, the main browser window is returned to the foreground, and an appropriate error message is delivered to the end user describing the error.

Figure 5:
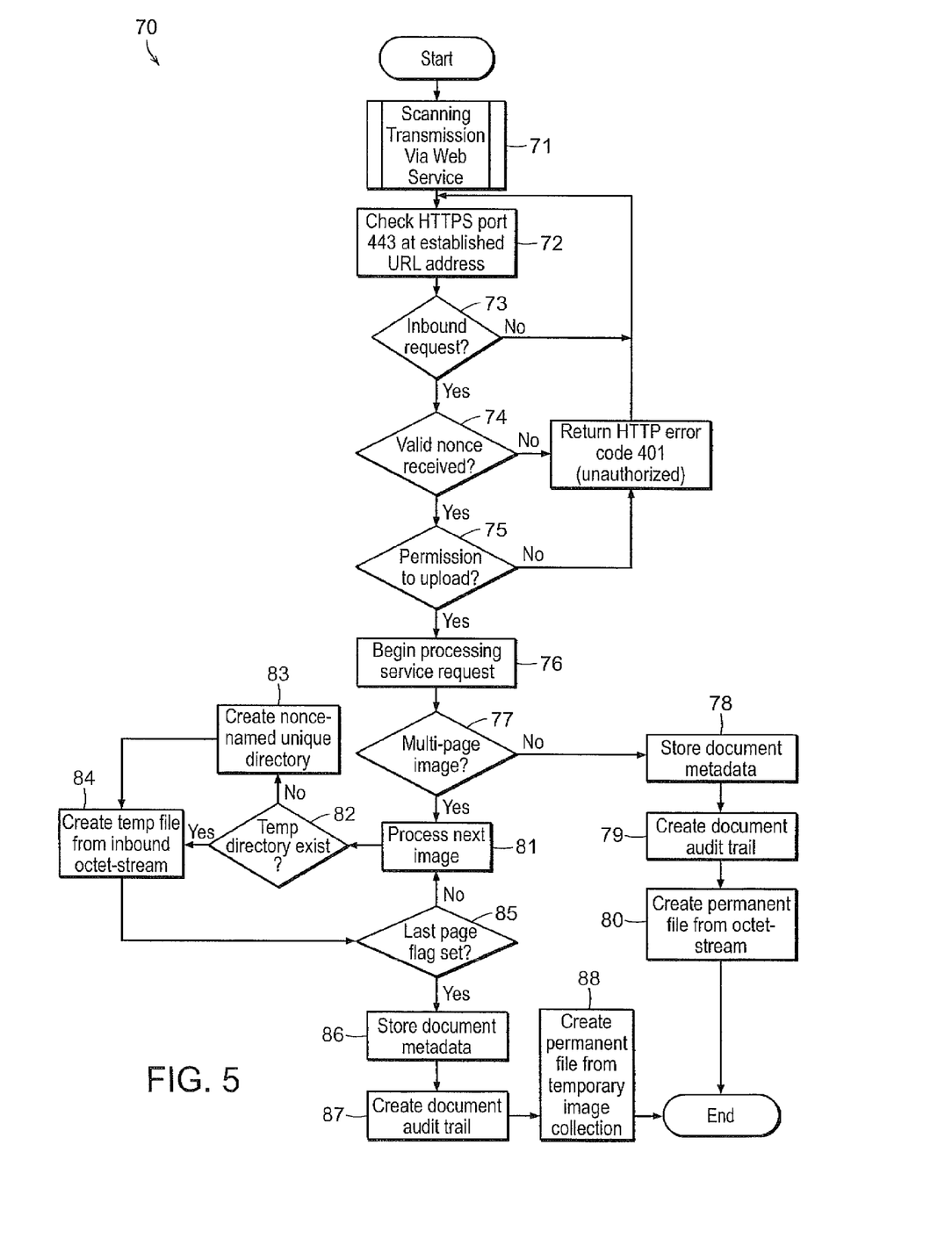
FIG. 5 is flowchart illustrating the operations of document capture server used in accordance with the invention.

FIG. 5 shows a flowchart 70 illustrating the operational steps performed by the document capture server 122. The document capture server 122 lifecycle begins with installation of the designated Java servlet container on the targeted web server. Once started and configured, the document capture server initiates a dedicated listener process. The document capture server process lifecycle is triggered by an inbound request, so the scanning transmission process as discussed in FIG. 4 must run as a first step, as shown in step 71.

The dedicated listener constantly monitors HTTPS port 443 at a designated Uniform Resource Locator (URL) address, as shown in step 72. This URL address is specified during the servlet container (e.g. Apache Tomcat) installation and configuration process and is the location at which all captured output from the scanning and file uploading processes will be sent.

Each captured image ultimately generates a new service request and associated processing thread on the document capture server. The document capture server continuously monitors HTTPS port 443 at the designated URL address for any inbound service requests, as shown in step 73. If a valid inbound request is received, it is immediately checked for the presence of a valid nonce, as shown in step 74. All inbound requests must present a valid security nonce to be accepted into the security realm. If a valid nonce is not received, then the request is denied and an HTTP error code of 401 (unauthorized) is returned to the originating source. If a valid nonce is received, then the server attempts to validate whether the submitting end user has proper permission to upload documents to the server by verifying internally established rights. If the submitting end user does not have permission to upload documents and associated metadata, then the request is denied and an HTTP error code of 401 (unauthorized) is returned to the end user. If, however, the inbound request provides a valid nonce and has permission to upload, as shown in step 75, then the document capture server spawns a dedicated processing thread and begins processing the service request, as shown in step 76.

The first task in processing the service request is to check for the presence of a multi-page image, as shown in step 77. If a multi-page image is not detected, then the dedicated processing thread reads and stores the document metadata, as shown in step 78, creates the appropriate document audit trail entries in the target metadata database, as shown in step 79, and then creates and stores a permanent file from the inbound octet-stream, as shown in step 80. Once the permanent file is created, the service request is fulfilled and the dedicated processing thread is terminated.

If a multi-page image is indicated, then the dedicated processing thread grabs the next image for processing, as shown in step 81. After the next image is queued for processing, the dedicated processing thread checks for the existence of a temporary directory for storing the pages associated with the inbound multi-page document, as shown in step 82. A temporary directory is used to aggregate all related document pages in a single, unique location. To ensure the uniqueness of the temporary storage path, the temporary directory is named after the session nonce associated with the currently active service request. If a nonce-named unique directory does not exist, then the dedicated processing thread creates the temporary directory, as shown in step 83, and then creates the initial temporary image file from the inbound octet-stream within the newly created temporary directory, as shown in step 84.

After the temporary directory is created and the currently active inbound octet-stream is fully written to the directory, the dedicated processing thread checks the last page metadata flag value, as shown in step 85. The last page flag value is a simple Boolean indicator identifying the current page as the last page in the transmission stream. If the last page flag indicates that the current page is not the last page of the transmission, then the processing thread proceeds to verify and process the next image in the transmission stream. In some cases, the multi-page flag may be set yet only a single page is transmitted. This can occur under normal operating conditions, such as when a double-sided document is processed by a scanner under the multi-page setting, however the second page is blank and therefore detected and skipped as scan time.

Each time an individual page from a multi-page transmission is received and processed—whether it be the first page or last page—the processing thread verifies the existence of the nonce-named temporary directory, creates the nonce-named directory if not found, and creates the next temporary file from the now-current inbound octet-stream. Once the last page flag indicates the last page has been reached, the associated image has already been written to the temporary directory, so the dedicated processing thread only needs to read and store the associated multi-page document metadata, as shown in step 86, create the appropriate multi-page document audit trail entries in the target metadata database (e.g. document origin, creation date and time, scanning user, or the like), as shown in step 87, aggregate all temporary files into a multi-page file, and write the completed multi-page file to the permanent storage location, as shown in step 88. Once the permanent file is created, the service request is fulfilled and the dedicated processing thread removes the nonce-name temporary directory and is terminated.

Although the present invention has been shown and described with respect to several preferred embodiments thereof, various changes, omissions and additions to the form and detail thereof, may be made therein, without departing from the spirit and scope of the invention.

What is claimed is:

1. A browser based scanning utility, comprising:
 a browser based capture application initiating an image capture call on a client device; and
 a web scanning module having instructions for:
  activating one or more image capture devices for scanning a plurality of pages associated with one documents into a-specific image data upon receiving the image capture call;
  as each page of the plurality of pages is being scanned, determining whether a specific image data for the page is available for uploading; and
  upon a positive determination, uploading the available specific image data from the client device to a document capture server over a network for storage and maintenance.

2. The browser based scanning utility of claim 1, wherein the web scanning module comprises an image capture module that provides a list of available image capture devices for use.

3. The browser based scanning utility of claim 1, wherein the web scanning module comprises an upload manager that manages the uploading of the available specific image data to the document capture server.

4. The browser based scanning utility of claim 3, wherein the upload manager creates a plurality of upload threads to upload the available specific image data.

5. The browser based scanning utility of claim 4, wherein the document capture server comprises a scan handler that receives the available specific image data from the upload manager using the plurality of upload threads.

6. The browser based scanning utility of claim 1, wherein the document capture server comprises a multipage document storage module for managing specific image data associated with a document having multiple pages and storing metadata and contents of the specific image data.

7. The browser based scanning utility of claim 1, wherein the document capture server spawns additional threads to deliver a scanning applet to multiple users concurrently as necessary.

8. The browser based scanning utility of claim 1, wherein the document capture server comprises a single page document storage module for managing specific image data corresponding to a single page document and storing metadata and contents of the specific image data.

9. The browser based scanning utility of claim 1, wherein the web scanning module comprises an image queue for managing the available specific image data, the image queue being constructed in a memory of the client device and used in uploading the available specific image data to the document capture server as each page of the plurality of pages is being scanned.

10. A method of managing a scanned image, comprising:
creating a browser based capture application by executing a scanning applet on a client device; and
sending, by the browser based capture application, an image capture call to a web scanning module,
wherein the web scanning module has instructions for:
activating one or more image capture devices for scanning a plurality of pages associated with one documents into a-specific image data;
as each page of the plurality of pages is being scanned, determining whether a specific image data for the page is available for uploading; and
upon a positive determination, uploading the available specific image data from the client device to a document capture server over a network for storage and maintenance.

11. The method of claim 10, wherein the activating the one or more image capture devices includes providing a list of available image capture devices available for use by an image capture module.

12. The method of claim 10, wherein the uploading the specific image data includes managing the uploading of the available specific image data to the document capture server by an upload manager.

13. The method of claim 12, wherein the managing the uploading of the available specific image data comprises automatically re-authenticating an upload transaction of the available specific image data to the document capture server thereby associating the uploaded specific image data to a user.

14. The method of claim 12, wherein the managing the uploading of the available specific image data comprises creating a plurality of upload threads by the upload manager to upload the available specific image data.

15. The method of claim 14, wherein the document capture server comprises a scan handler that receives the available specific image data from the upload manager using the plurality of upload threads.

16. The method of claim 10, wherein the document capture server comprises a multipage document storage module for managing specific image data associated with a document having multiple pages and storing metadata and contents of the specific image data.

17. The method of claim 16, wherein the document capture server spawns additional threads, each of the additional threads running a copy of the multipage document storage module to accommodate multiple concurrent users.

18. The method of claim 10, wherein the document capture server comprises a single page document storage module for managing specific image data corresponding to a single page document and storing metadata and contents of the specific image data.

19. The method of claim 10, wherein the web scanning module comprises an image queue for managing the available specific image data, the image queue being constructed in a memory of the client device and used in uploading the available specific image data to the document capture server as each page of the plurality of pages is being scanned.

20. A method of performing browser based scanning, comprising:
receiving an image capture call initiated by a browser based capture application on a client device;
activating one or more image capture devices for scanning a plurality of pages associated with one documents into specific image data based on the image capture call;
as each page of the plurality of pages is being scanned, determining whether a specific image data corresponding to the page is available for uploading; and
upon a positive determination, uploading the available specific image data from the client device to a document capture server over a network for storage and maintenance,
wherein the determining and the uploading are performed asynchronously.

21. The method of claim 20, wherein the activating the one or more image capture devices includes providing a list of available image capture devices for use.

22. The method of claim 20, wherein the uploading the available specific image data requires a plurality of upload threads to upload the available specific image data.

23. The method of claim 22, wherein the document capture server comprises a scan handler that receives the available specific image data from the upload manager using the plurality of upload threads.

24. The method of claim 20, wherein the document capture server comprises a multipage document storage module for managing specific image data associated with a document having multiple pages and storing metadata and contents of the specific image data.

25. The method of claim 24, wherein the multipage document storage module spawns additional threads as necessary to accommodate concurrent users.

26. The method of claim 20, wherein the document capture server comprises a single page document storage module for managing specific image data corresponding to a single page document and storing metadata and contents of the specific image data.

27. The method of claim 20, wherein the uploading the available specific image data comprises adding the available specific image data to an image queue on the client device and uploading the added available specific image data to the document capture server as each page of the plurality of pages is being scanned.

28. The method of claim 27, wherein the adding the available specific image data to the image queue includes identifying whether a color map of the available specific image data is one of a black-and-white image and a colored data, compressing the available specific image data based on the identified color map, and adding the compressed available specific image data to the image queue for uploading to the document capture server.

29. The method of claim 27, wherein the adding the available specific image data to the image queue includes determining whether the available specific image data corresponds to a first available specific image data and upon a positive determination, constructing the image queue based on a size of the determined available specific image data.

30. The method of claim 29, wherein the constructing the image queue includes determining an available space on a memory of the client device, dividing the available space on the memory of the client device with the size of the determined available specific image data, and multiplying a result of the dividing with a padding value, a size of the image queue based on the result.

* * * * *